Nov. 14, 1939.    J. W. LEIGHTON    2,180,283

METHOD OF MAKING BEARINGS

Filed May 11, 1938

INVENTOR
John W. Leighton
BY
Harness, Dickey & Pierce.
ATTORNEYS.

Patented Nov. 14, 1939

2,180,283

UNITED STATES PATENT OFFICE 2,180,283

METHOD OF MAKING BEARINGS

John W. Leighton, Port Huron, Mich.

Application May 11, 1938, Serial No. 207,341

8 Claims. (Cl. 29—149.5)

The present invention relates to the manufacture and assembly of threaded pivotal bearings, and has particular relation to the manufacture and assembly of such bearings for use in individual wheel suspension for automobiles. In certain of its aspects, the present invention is an improvement upon and an extension of the inventions disclosed in the co-pending applications of the present applicant, Serial No. 69,785, filed March 20, 1936, and Serial No. 160,396, filed August 23, 1937.

As discussed in more detail in the above two co-pending applications, in certain instances, and in particular in connection with individual wheel suspension, two parts of a structure are pivotally connected by threaded bearings, and it is desirable to so form the bearings that there will be no binding action or undesirable friction in the thread during oscillatory movement of one part with respect to the other. In the above identified co-pending application Serial No. 69,785, the matching of the threads is effected by threading a bushing onto a threaded pin portion and simultaneously causing external threads on the bushing to form internal threads in an opening receiving the pin portion, all of this being done after a first threaded bearing has been effected at another point. In the other above identified co-pending application, Serial No. 160,396, the above mentioned thread formation is effected by means of a tubular tap, which is matched with the bushing ultimately to be used in the bearing. In either instance since the threads formed within the opening are accurately matched relative to the threads of the bushing, it is apparent that relative movement of the pin portion and the portion having the opening is not required during the final assembly operation and accordingly, under these circumstances, the threads at both points will be freely pivotal.

In accordance with the inventions of both of the above two co-pending applications, as well as in accordance with the present invention, the thread forming operation involves a displacement of the metal of the member on which the threads are to be formed. In accordance with the prior copending disclosures, it is preferred to provide metal receiving wells or spaces to accommodate this displaced metal. In application Serial No. 160,396, also the tap is provided with flutes along the length thereof, into which all or part of the displaced metal may flow.

With respect to the problem of accommodating the metal displaced during the threading operation, a primary object of the present invention is to provide an arrangement in which the displaced metal may be accommodated without resorting to the provision of metal receiving wells or spaces; to provide an arrangement which may be characterized as permitting the use of a cylindrical form on the member in which the threads are to be formed; to provide an arrangement which may be characterized in that the displaced metal is permitted to flow into the root spaces between the adjacent turns on the threading member.

Further objects of the present invention are to provide an arrangement of the above generally indicated character, in which the member in which the thread is to be formed is composed of a relatively soft metal, thus facilitating the displacement of the metal during the threading operation; and to provide an arrangement in which the threads to be formed are of relatively shallow or obtuse character, thus further facilitating the thread forming operation.

It will be appreciated that in assembling a bearing of the above generally indicated character, the initially threaded member and the member in which the threads are to be formed are required to be firmly held during the threading operation in positions closely corresponding to those which they would occupy relative to each other in the completely assembled bearing. During the threading operation, the initially threaded member acts as a pull bar, so to speak, and pulls the threading member into or onto the member to be threaded. It has been found that, in certain instances, if the initially threaded member and the member to be threaded are held, during the threading operation, in precisely the same positions which they would occupy in the completely assembled bearing, the resultant bearing tends to be unduly tight. This appears to be due to the fact that since the initially threaded member acts as a pull bar, the threads of such member and the threading member are forced into exceedingly tight lateral engagement. A further important object of the present invention is to overcome this tendency to produce a tight bearing, by holding the initially threaded member and the member to be threaded in positions which are slightly displaced from the final positions thereof relative to each other, the displacement being caused by springing a part of the structure. With this relation, at the conclusion of the threading operation, the holding means for the member is released, and the sprung member resumes its normal position. The degree of springing or displacement is preferably so proportioned that when the member is released, it assumes a position in which the bearing is entirely freely pivotal.

With the above as well as other objects in view, which appear in the following description, a preferred but illustrative embodiment of the invention is shown in the accompanying drawing, throughout the several views of which corresponding reference characters are used to designate corresponding parts in which.

It will be appreciated for a complete understanding of the invention, that the improvements thereof are applicable, in a generic sense, to a wide variety of uses. Preferably, and as specifically illustrated, however, the improvements of the invention are applied to wishbone constructions particularly adapted for wheel suspensions in automobiles.

Figure 1:
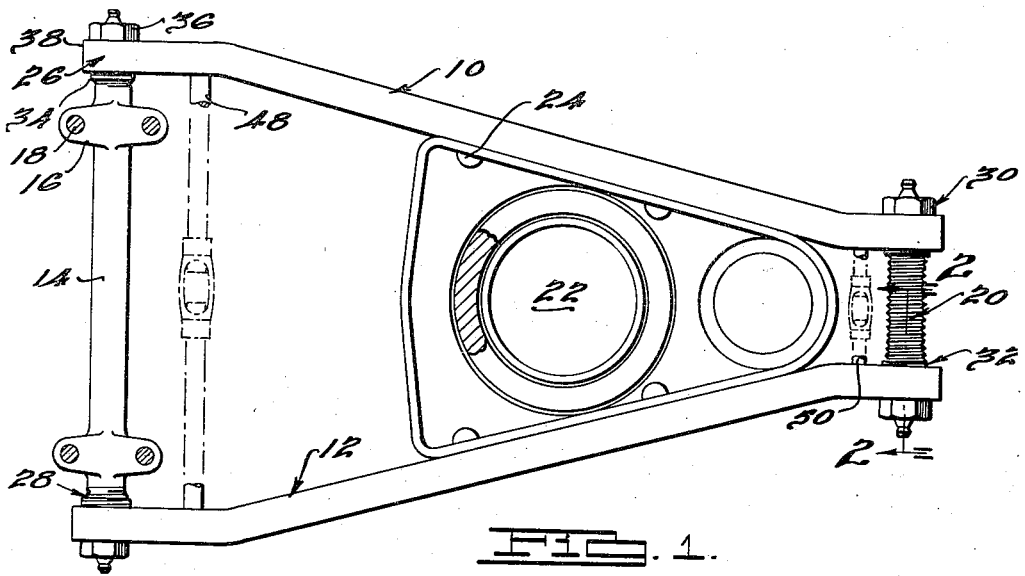
Figure 1 is a top plan view of an illustrative wishbone for a wheel suspension, in connection with which the invention may be practiced.

An illustrative wishbone structure for a vehicle front wheel suspension is shown in Figure 1, as comprising a pair of wishbone arms 10 and 12, of generally similar form. The inner end of the arms 10 and 12 are connected together by means of a bar member 14, provided with means such as the ears 16, by which it may be connected to the vehicle frame by means of studs 18. The outer ends of the arms 10 and 12 are connected together by means of a threaded element 20, which is adapted to cooperate with means (not shown) by which the vehicle wheel king-pin and wheel assembly is connected to the arms 10 and 12. Preferably and as illustrated a spring pan and buffer assembly designated as a whole as 22 is connected between the arms 10 and 12 as by means of the rivets 24. As is described in more detail in the above identified co-pending applications, the just described lower wishbone structure is in practice associated with an upper wishbone structure, pivotally connected at one end to the vehicle frame, and pivotally connected at the other end to the king-pin structure. A spring supported by the pan 22 is connected between the pan 22 and the frame structure. In operation, springing movements of the associated vehicle cause a rotation of the arms 10 and 12 relative to the bar member 14 and also relative to the connecting pin 20. To accommodate these springing movements, pivotal bearings 26 and 28 are provided between the arms 10 and 12 and the bar 14 respectively, and pivotal bearings 30 and 32 are provided between the arms 10 and 12 and the pin 20 respectively.

Each of the bearings 26 and 30 may and preferably do follow in detail the construction described in applicant's prior Patent No. 1,924,448, granted August 29, 1933. As is described in more detail in this patent, bearings 26 and 30 may comprise a threaded pin portion, such as 34 in Fig. 1, which is received in an internally threaded bushing 36. Each bushing 36, in turn, is received in an internally threaded opening formed in the associated end such as 38 of the arm 12. Each bushing 36 is preferably provided with an enlarged head which jams against the outer face of the associated arm when the parts reach the fully assembled position and so locks the bushing within the associated arm opening. The bearing rotation, accordingly, occurs between the threads of the pin portion 34 and the internal threads formed in the bushing.

In assembling the construction shown in Fig. 1, it is preferred to first connect the arms 10 and 12 together by means of the spring pan and buffer assembly 22. Thereafter, the bar 14 may be inserted into its corresponding opening in the arm 10, to the proper axial position relative thereto and the bearing 28 may then be completed by threading the bushing such as 36 into the arm opening and onto the threaded pin portion 34. The bearing 30 may be correspondingly assembled, by inserting the pin 20 into the corresponding opening in the arm 10 to the proper axial position, and finally threading the associated bushing into the arm and onto the pin until such time as the relatively shallow or obtuse threads thereon bind in the corresponding threads in the arm opening.

The present invention is concerned primarily with the method of forming and assembling the bearings 28 and 32, which may be and preferably are of corresponding construction and arrangement, so that a description of one will suffice for both.

Figures 2, 3:
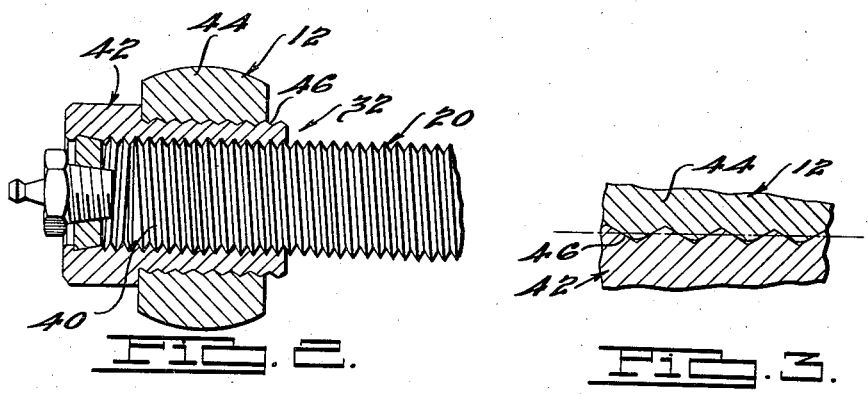
Fig. 2 is a detailed view, taken along the line 2—2 of Fig. 1.
Fig. 3 is an enlarged detailed view showing the preferred form of the thread to be formed in the practice of the invention.

In Fig. 2, the bearing 32 is shown in detail as comprising the threaded end portion 40 on the pin 20, an intermediate bushing 42 and an extreme end portion 44 of the arm 12. The general arrangement of this bearing corresponds to that described with reference to the bearings 28 and 32, as will be evident. In the specific form shown, the end portion 40 on the pin 20 is initially formed with threads of selected form, lead and pitch, and the bushing 42 is initially provided with internal threads of corresponding form, lead and pitch. In addition, the bushing 42 is initially formed with external threads 46 of a lead and pitch corresponding to that of the internal thread, but of much shallower form or depth. The extreme end portion 44 of the arm 12 is provided with an initially cylindrical opening to receive the bushing 42. The bearing movement occurs between the threads of the pin and the thread within the bushing, so that the bushing 42 and the pin 20 are preferably formed of hardened metal, suitable for bearing purposes.

In accordance with the present invention, the end portion 44 of the arm 12, and particularly the portion thereof which defines the cylindrical opening, is of relatively soft metal, so that during the assembly operation, the bushing 42 may form threads on the inner surface thereof which are complemental to the threads 46. With this relation, the threading of the bushing onto the pin 20 and into the opening in the arm 10 does not involve any relative movement between the pin 20 and the arm 10. Consequently, both of the threaded bearings 26 and 28 are freely pivotal.

In further accordance with the present invention, the thread forming operation is accomplished by displacing the metal which forms the inner surface of the opening in the end of the arm 12. The displaced metal is enabled to flow into the root portions of the spaces between adjacent turns of the thread 46, which relation is clearly shown in Fig. 3. To permit this flow of the metal, it is preferred to form the opening in the arm 10 of an initial diameter which approximates the pitch diameter of the thread 46. With this relation, as the threads 46 are advanced into the initially cylindrical opening in the arm 12, the metal displaced by the thread 46, is afforded an opportunity to flow into the root spaces between the successive turns of the thread 46. The relation between the pitch diameter of the thread 46 and the original inside diameter of the opening in the arm 12 is preferably so proportioned that the volume of displaced metal substantially fills the just mentioned root spaces, which relation is clearly shown in Fig. 3.

It is found that the thread forming operation is materially facilitated by forming the thread 46 of relatively shallow or obtuse form. This improvement appears to be due to the fact that the obtuse or shallow threads minimize the actual degree the metal flow or displacement which is required to take place.

Figure 4:
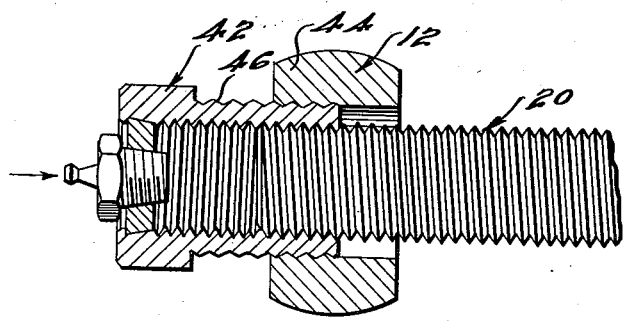
Fig. 4 is a view corresponding generally to Fig. 2, but showing the parts in partially assembled relation.

It will be appreciated that since the arms 10 and 12 are connected together by means of the spring and buffer assembly 22, the assembly of the bearings 26 and 30 results in bringing the ends of the rod 14 of the pin 20 to substantially correct axial position within the openings formed in the ends of the arm 12. With the parts thus preliminarily positioned, the bearing 32 may be completed by threading the bushing 42 on the pin 20 and into the opening 44 in the end of the arm 12, all as described above in detail with reference to Figs. 2 and 3. An intermediate assembled position of the parts is indicated in Fig. 4, in which the bushing 42 is shown in partially threaded position into the opening in the end of the arm 12. Thereafter the bearing 28 may be correspondingly completed, by threading its associated bushings onto the threaded end of the bar 14 and into the corresponding opening in the arm 12.

As pointed out hereinbefore, it is preferred to slightly displace the initially threaded member and the member to be threaded, during the threading operation, so as to overcome any otherwise existing tendency for the threading operation to produce an unduly tight bearing. With this consideration in view, it is preferred in assembling the bearings 22 and 28 to interpose spreaders, designated 48 and 50, between the arms 10 and 12. The spreaders 48 and 50 are adjustable as to length, and it will be appreciated that during the assembly operation, the spreaders 48 and 50 are adjusted so as to displace the ends of the arm 12 relative to the pin 20 and the bar 14, a relatively small distance, such as a few thousandths of an inch, from the correct relative positions thereof. At the conclusion of the threading operations, the spreaders 48 and 50 may be removed, permitting the ends of the arm 12 to spring back to the correct axial position thereof. The return movement of the ends of the arm 12 relieves any otherwise existing tendency for the threads on the bushings to bind on the threads of the pin 20 and the bar 14. The degree of displacement is proportioned to have a value intermediate the degree of play normally provided, as a consequence of usual manufacturing tolerances, between the threads on the bushings and the cooperating threads on the pin 20 and the cross-bar 14.

With the illustrated arrangement, in which the spreaders are connected directly between the arms 10 and 12, as distinguished from being connected between the arm 12 and the pin 20 and cross-bar 14, respectively, it will be appreciated that the spreading operation may be expected to also distort the ends of the arm 10 to some extent. The removal of the spreaders eliminates this distortion, however, and so relieves any otherwise existing tendency for the development of undue tightness in the bearings 26 and 30 during the assembly of the bearings 28 and 32.

From the foregoing description, it will be appreciated that the present invention provides an extremely simple and effective threaded bearing assembly and a method of making the same, characterized in that the threads in one of the elements of the bearings are formed by a companion member, as an incident to an assembly operation. More particularly, the invention may be characterized in that the parts are so related that the material displaced by the threading operation is enabled to flow into and occupy the inter-thread spaces formed on the companion member. The threading operation moreover, is facilitated by the use of a relatively soft element in which the thread is to be formed and by utilizing threads of shallow or obtuse form.

The feature of initially displacing the members of the bearings serves the purpose of ensuring that all of the threaded bearings in the resultant structure will be freely pivotal, as well as being perfectly matched.

Although only a single embodiment of the invention has been described in detail, it will be appreciated that various modifications of the form, number, and arrangement of the parts thereof, as well as the specific method of practicing the same, may be made within the spirit and scope of the invention.

What is claimed is:

1. The method of manufacturing a threaded bearing assembly which comprises utilizing first, second and third members having surfaces disposed to be provided with respective internal and external threads so that one of the members can be threaded onto one of the other members and threaded into the other member; initially forming threads of like lead and pitch on all but one of the said surfaces; forming said one surface of a diameter intermediate the root and crest diameter of the threads on the cooperating surface; and simultaneously threading said members together so as to form the threads on the remaining surface by a flow of the metal thereof caused by the threads on the cooperating surface.

2. The method of manufacturing a threaded bearing assembly which comprises utilizing an inner member disposed to have external threads formed thereon and an outer member disposed to have internal threads thereon, initially forming the said threads on one of said members and forming the other said member of a diameter intermediate the root and crest diameters of the threads to be formed thereon, and simultaneously threading a tubular member having external and internal threads thereon onto said inner member and into said outer member, said tubular member acting to cause a flow of the metal of said outer member so as to form the threads thereon.

3. The method of manufacturing two parts of a structure wherein one part includes two like threaded pin portions substantially fixed relatively and the other part includes two openings substantially fixed relatively and into which the pin portions are adapted to project and at least one of which openings is larger than the pin portion therefor, which comprises establishing a threaded, pivotal bearing between one pin portion and one opening, disposing the other pin portion in the other opening, providing an internally and externally threaded tubular member wherein the internal and external threads have the same pitch and lead as the threads on such other pin portion and wherein the external threads have a pitch diameter approximately equal to the diameter of the other opening, and threading the member onto such other pin portion so as to simultaneously cause the external threads on the member to cause a flow of the metal of the other member so as to form threads in said other opening.

4. The method of manufacturing two parts of a structure wherein one part includes two like threaded pin portions substantially fixed relatively and the other part includes two openings substantially fixed relatively and into which the pin portions are adapted to project and at least one of which openings is larger than the pin portion therefor, which comprises establishing a threaded, pivotal bearing between one pin portion and one opening, disposing the other pin portion in the other opening, providing an internally and externally threaded tubular member wherein the internal and external threads have the same pitch and lead as the threads on such other pin portion and wherein the external threads are of obtuse form and have a pitch diameter approximately equal to the diameter of the other opening, and threading the member onto such other pin portion so as to simultaneously cause the external threads on the member to cause a flow of the metal of the other member so as to form threads in said other opening.

5. The method of assembling a threaded bearing which comprises utilizing an external threading surface, an outer member having an internal threading surface, and an intermediate member having external and internal threading surfaces for cooperation respectively with said surfaces of said inner and outer members, which includes initially forming said surfaces of said intermediate and inner members with threads of similar lead, forming the external threads on the intermediate member of obtuse form and of a pitch diameter approximately equal to the diameter of the threading surface of the outer member, and threading said intermediate member onto said inner member and into said outer member simultaneously, the intermediate member producing a flow of the metal of the outer member so as to form threads in said outer member during said threading.

6. The method of assembling an inner member, an outer member, and an intermediate member, disposed to be threaded into said outer member and onto said inner member, said inner and outer members being disposed to have predetermined axial positions relative to each other, which includes initially forming certain of said members with mating threads, forming threads in one of said members by another of said members during the assembly of said members, and holding said inner and outer members in axial positions slightly displaced from said predetermined positions during said assembly operation.

7. The method of assembling a threaded bearing which comprises utilizing an inner member having an external threading surface, an outer member having an internal threading surface, and an intermediate member having external and internal threading surfaces for cooperation, respectively, with said surfaces of said inner and outer members, said inner and outer members being disposed to have predetermined axial positions relative to each other in the completed bearing, which includes initially forming all but one of said surfaces with similar threads, forming the threads in the remaining surface by the threads in the cooperating surface during the assembly operation, and holding said inner and outer members in positions slightly displaced from said predetermined positions during said assembly operation.

8. The method of manufacturing a threaded pivotal bearing, which bearing comprises an inner member having an external threading surface and an outer member having an internal threading surface, said inner and outer members being disposed to have predetermined axial positions relative to each other in the completed bearing, which includes initially forming a thread upon one of said surfaces, simultaneously threading a tubular member having external and internal threads thereon onto said inner member and into said outer member, said tubular member acting to form the said threads on the remaining said surface during said threading operation, and holding said inner and outer members in positions slightly displaced from said predetermined positions during said threading operation.

JOHN W. LEIGHTON.